(12) United States Patent
Gehringhoff et al.

(10) Patent No.: US 6,474,708 B2
(45) Date of Patent: Nov. 5, 2002

(54) COMPOSITE SUSPENSION CONTROL ARM SHAFT FOR MOTOR VEHICLES

(75) Inventors: Ludger Gehringhoff, Paderborn; Wulf Härtel, Detmold; Knut Schöne, Lippstadt; Ralf Schmidt, Oelde; Dieter Braun, Rheda-Wiedenbrück, all of (DE)

(73) Assignee: Benteler AG, Paderborn (DE)

( * ) Notice: Subject to any disclaimer, the term of this patent is extended or adjusted under 35 U.S.C. 154(b) by 0 days.

(21) Appl. No.: 09/528,486

(22) Filed: Mar. 17, 2000

(65) Prior Publication Data
US 2002/0101085 A1 Aug. 1, 2002

(30) Foreign Application Priority Data
Mar. 18, 1999 (DE) .......................................... 199 12 272

(51) Int. Cl.[7] ............................ F16F 7/12; B60R 19/02; B60R 19/03; B60R 19/12; B60R 19/26
(52) U.S. Cl. ..................... 293/120; 293/121; 293/122; 293/132; 293/146; 188/376; 188/377
(58) Field of Search .................................. 293/146, 132, 293/133, 120, 121, 122, 135, 136, 107, 109; 296/188, 189; 188/371, 376, 377

(56) References Cited

U.S. PATENT DOCUMENTS

| | | | | |
|---|---|---|---|---|
| 1,673,692 A | * | 6/1928 | Marston | 293/107 |
| 3,694,018 A | * | 9/1972 | Levering | 293/121 |
| 3,917,332 A | * | 11/1975 | Puleo | 293/109 |
| 4,088,357 A | * | 5/1978 | Klie et al. | 293/122 |
| 4,272,114 A | * | 6/1981 | Hirano et al. | 293/133 |
| 4,348,042 A | * | 9/1982 | Scrivo | 293/122 |
| 4,359,239 A | * | 11/1982 | Eggert, Jr. | 293/132 |
| 4,468,052 A | * | 8/1984 | Koike | 293/120 |
| 4,714,287 A | | 12/1987 | Merkle | |
| 4,998,761 A | * | 3/1991 | Bayer et al. | 293/121 |
| 5,094,469 A | * | 3/1992 | Yamamoto et al. | 293/146 |
| 5,100,189 A | * | 3/1992 | Futamata et al. | 293/132 |
| 5,139,297 A | * | 8/1992 | Carpenter et al. | 293/132 |
| 5,150,935 A | * | 9/1992 | Glance et al. | 293/136 |

(List continued on next page.)

FOREIGN PATENT DOCUMENTS

| | | |
|---|---|---|
| DE | 2941879 | 4/1980 |
| DE | 4413641 | 6/1995 |
| DE | 196 35 285 A1 | 3/1997 |
| DE | 196 11 934 C1 | 4/1997 |
| DE | 196 43 049 A1 | 4/1998 |
| DE | 197 00 022 A1 | 7/1998 |
| GB | 2328654 | 3/1999 |
| JP | 08 175 295 A | 7/1996 |
| WO | 9520506 | 8/1995 |
| WO | 9841423 | 9/1998 |

*Primary Examiner*—D. Glenn Dayoan
*Assistant Examiner*—H. Gutman
(74) *Attorney, Agent, or Firm*—Friedrich Kueffner (57) ABSTRACT

A bumper arrangement for a front end or a rear end of an automobile having a bumper cover enclosing the bumper arrangement has a transverse support having a first and a second end. First and second spacer consoles are connected to the first and second ends of the transverse support, respectively. First and second stop plates are connected to the first and second spacer consoles opposite the transverse support. The first and second stop plates secure the bumper arrangement to longitudinal support beams of the car body extending in the longitudinal direction of the automobile. A transverse beam is positioned below the transverse support in a mounted position of the bumper arrangement. Spacer stays connect the transverse beam to the stop plates and are positioned below the spacer consoles. The transverse support and/or the spacer consoles, at least over portions thereof, have two or more deformation areas arranged next to one another in the longitudinal direction of the automobile. These deformations areas have different force levels.

16 Claims, 9 Drawing Sheets

U.S. PATENT DOCUMENTS

| | | | |
|---|---|---|---|
| 5,290,078 A | * | 3/1994 | Bayer et al. ................. 293/120 |
| 5,314,229 A | * | 5/1994 | Matuzawa et al. .......... 296/189 |
| 5,560,672 A | * | 10/1996 | Lim et al. .................... 296/189 |
| 5,732,801 A | | 3/1998 | Gertz |
| 5,785,367 A | * | 7/1998 | Baumann et al. ........... 293/133 |
| 5,803,514 A | * | 9/1998 | Shibuya et al. ............. 293/133 |
| 6,179,355 B1 | * | 1/2001 | Chou et al. .................. 293/120 |
| 6,203,078 B1 | * | 3/2001 | Karrer ........................ 293/146 |
| 6,203,098 B1 | * | 3/2001 | Motozawa et al. ......... 293/133 |
| 2001/0026073 A1 | * | 10/2001 | Sato et al. ................... 293/121 |
| 2001/0030432 A1 | * | 10/2001 | Mansoor et al. ............ 293/120 |
| 2002/0047281 A1 | * | 4/2002 | Hartel et al. ................ 293/102 |

* cited by examiner

COMPOSITE SUSPENSION CONTROL ARM SHAFT FOR MOTOR VEHICLES

BACKGROUND OF THE INVENTION

1. Field of the Invention

The invention relates to a bumper arrangement enclosed by a cover and mounted on the front end or rear end of a car body of an automobile.

2. Description of the Related Art

A bumper arrangement for the front module of an automobile is known from German patent 196 11 934 C1. It is comprised of two transverse supports arranged above one another. While the upper transverse support is directly connected to upper longitudinal support beams of the car body of the automobile, impact damping members are provided between the lower longitudinal support beams of the car body and the transverse support. Furthermore, the two transverse supports are connected to one another in the area of the impact damping members via tension and compression bars that are arranged in a V-shape. The compression bars extend from the upper transverse support to portions of the impact damping members connected to the lower longitudinal support beam, while the tension bars extend from the upper transverse support to the portions of the impact damping members connected to the lower transverse support. Moreover, the tension bars which have a weaker impact resistance are provided with predetermined breaking points which have the object to allow as little load as possible to be transmitted into the upper support plane upon impact.

In the known case, the two transverse supports are supposed to form a rigid frame. In an impact situation in which the bumper arrangement impacts another vehicle from below, the upper transverse support is subjected to a load which is transmitted via the compression bars onto the relatively rigid lower support plane where it is neutralized or compensated. At the same time, a bending load is exerted onto the connecting points of the compression bars caused by the force component acting in the direction of the longitudinal vehicle axis. Because of the incorporation of the tension bars, these connecting points are relieved of load. The tension bars load substantially only the lower support plane. With such an arrangement, a front module is supposedly provided which has high stability in accidents, is repair-friendly, and provides an optimal impact behavior in situations in which the bumper arrangement impacts another vehicle from below as well as in high speed impacts.

SUMMARY OF THE INVENTION

It is an object of the present invention to provide a bumper arrangement for the front or rear end of a car body of an automobile enclosed by a cover which fulfills its function in a crash situation with low force level at low speed as well as in a crash situation with high force level at high speed and great mass.

In accordance with the present invention, this is achieved in that the bumper arrangement comprises a transverse support whose ends are connected by spacer consoles and stop plates to the longitudinal support beams of the car body and further comprises a transverse beam arranged below the transverse support which is also supported at the stop plates by means of spacer stays arranged below the spacer consoles, wherein the transverse support and/or the spacer consoles have at least over portions thereof at least two deformation areas with different force levels arranged next to one another in the longitudinal vehicle direction.

According to the invention, the transverse support, the transverse beam, the spacer consoles, and the spacer stays together are to be considered a unitary system for fulfilling the demanded requirements. In this manner, it is possible to respond in a directed manner to a respective crash situation. This is, on the one hand, a crash with low force level at low speed; this can be an impact with a minimal or great mass. On the other hand, a crash at a high force level and high speed with great mass is to be considered.

With the additional transverse beam below the transverse support it is possible to account for additional energy absorption in a front or rear crash situation. In addition to the additional energy absorption, a further positive effect of this arrangement is that an obstacle is impacted with a substantially larger surface area. This means that the type of impact is changed. Furthermore, an energy conversion onto at least two different force levels is realized. In this context, each force level is matched to a certain crash situation. In particular, it is possible without problems to design all components of the bumper arrangement in a differentiated manner with regard to function, material, and position and to optimize in this context the passive and active components in regard to vehicle safety with respect to fulfilling their function and requirements.

The deformation areas at the transverse support and/or at the spacer consoles can be designed in several ways. The material of the deformation areas can be a metal or can be a non-metallic material. Also possible is a composite construction. In this context, aluminum, steel, synthetic materials, magnesium or also foam materials can be employed. Furthermore, a hybrid design is possible.

Over all, a front or rear module is provided which can be integrated entirely into the car body of an automobile and can be exchanged, if needed, completely or partially, i.e., individual parts thereof can be replaced.

The transverse beam arranged below the transverse support can be tubular. The transverse beam can have a round, rectangular, or triangular cross-section.

Also conceivable is an embodiment in which the transverse beam has a profiled member design. The profiled member can have a hat-shaped cross-section with a bottom stay, two legs, and two flanges.

Independent of whether the transverse beam is tubular or a profiled member, steel, high strength steel, aluminum, plastic (synthetic) materials or composite materials can be used.

In order to allow further energy absorption in the area of the transverse beam, it may be expedient according to another configuration of the present invention to provide at least the surface area of the transverse beam facing the cover with a coating of an energy-absorbing material. Such a material can be, for example, a reversible or irreversible foam in the form of polyurethane (PUR), aluminum, epoxy resin (EP) etc.

When the transverse beam has a round cross-section, the coating is preferably provided over its entire circumference. In regard to other cross-sections or a transverse beam in the form of a profiled member, for example, having a hat-shaped cross-section, only the outer side of the transverse beam facing the cover is expediently coated with the energy-absorbing material.

The spacer stays arranged between the transverse beam and the stop plates are advantageously also in the form of profiled members. Preferred is, in particular, a hat-shaped cross-sectional profile. This makes it possible to provide the spacer stays with comparatively thin walls.

The spacer stays can also be embodied as hollow profiled members. Conceivable are rectangular, triangular or round cross-sections.

As has been mentioned above, the transverse support and/or the spacer consoles, at least over portions thereof, can have at least two deformation areas of different force levels, i.e., one being low and one being high, arranged next to one another in the longitudinal vehicle direction. In one embodiment the deformation areas with low force level are correlated with the rectangular, triangular, or round hollow profiled members of the spacer consoles. The deformation areas in this embodiment are formed by corrugated sidewalls of the spacer consoles. The basic design of the corrugation can be matched to the respective vehicle type.

However, in spacer consoles in the form of a hollow profiled member that can have any suitable cross-section, it is also possible to provide the deformation areas with low force level by a corresponding reduction of the wall thickness of the walls of the spacer consoles.

Furthermore, it is possible to design the deformation areas with low force level by providing penetrations or cutouts in the walls of the spacer consoles.

One embodiment according to the invention is realized in that the deformation areas with the low force level for spacer consoles having hollow profiled members of any suitable cross-section are formed by foam bodies. The force level can be adjusted in an optimal manner by the thickness of the foam body. It is possible to employ reversible or irreversible foams.

Preferably, the deformation areas of the spacer consoles with the low force level are positioned adjacent to the transverse support. Their position in the vicinity of the transverse support increases and optimizes the lateral stiffness of the spacer consoles.

However, it is also possible to position the deformation areas of the spacer consoles with the low force level adjacent to the stop plates.

The U-shaped transverse support having a bottom stay facing the cover can be provided with a longitudinal groove. This configuration is used, in particular, when the deformation area with the low force level is integrated into the spacer consoles.

In another embodiment, the deformation area with low force level is provided at the transverse support. For this purpose, the transverse support is U-shaped. Its legs point in the direction toward the cover. The legs can have flanges at their free ends. A strip-shaped foam body is inserted into the channel defined by the bottom stay and the legs and projects from the channel in the direction toward the cover. Preferably, it rests against the inner side of the cover. In this context, it is also possible to employ reversible or irreversible foam materials. The cross-sectional area of the channel can be used advantageously as a compression space.

A further embodiment suggests a tubular transverse support. In particular, a transverse support with a rectangular cross-section is used and the longitudinal axis of the cross-section extends vertically. At the longitudinal side of the transverse support facing the cover spaced apart openings or cutouts are provided. Into these openings foam blocks are inserted which rests against the inner side of the sidewall facing the sidewall provided with the cutouts or openings. The foam blocks project from the transverse support in the direction toward the cover. In particular, they rests against the inner side of the cover. Preferably, the foam blocks have a rectangular cross-section so that they are secured against rotation. Their function is fulfilled when in a crash situation the foam blocks are pressed completely into the tubular transverse support.

In yet another embodiment of the invention, the transverse support has two deformation areas with different force levels. For this purpose, the transverse support is comprised of two U-shaped profiled members. The inner U-shaped profiled member facing away from the cover has preferably two flanges projecting outwardly away from the legs in opposite directions. The outer U-shaped profiled member is connected with its legs to the inner U-shaped profiled member. Welding connections or adhesive connections can be used for this purpose, but other types of connections known to a person skilled in the art are also possible. The two bottom stays of the U-shaped profiled members are spaced from one another. The U-shaped profiled member neighboring the cover is of a weaker construction with respect to the force level, realized by means of the wall thickness and/or the material properties. In the case of an impact, this U-shaped profiled member is deformed first, elastically and/or plastically. When the impact force continues, both U-shaped profiled members together provide a resistance to the crash impact at a higher force level.

According to another embodiment of the invention, the transverse support is provided with the two adjacently positioned deformation areas of different force levels by having two U-shaped profiled members which are arranged such that their legs face one another. Advantageously, the two U-shaped profiled members have flanges at their legs by which the U-shaped profiled members are connected to one another. In this embodiment, the U-shaped profiled member adjacent to the cover is also designed to be weaker with regard to the force level by adjusting the wall thickness and/or the material properties.

DESCRIPTION OF THE PREFERRED EMBODIMENTS

Figure 1:
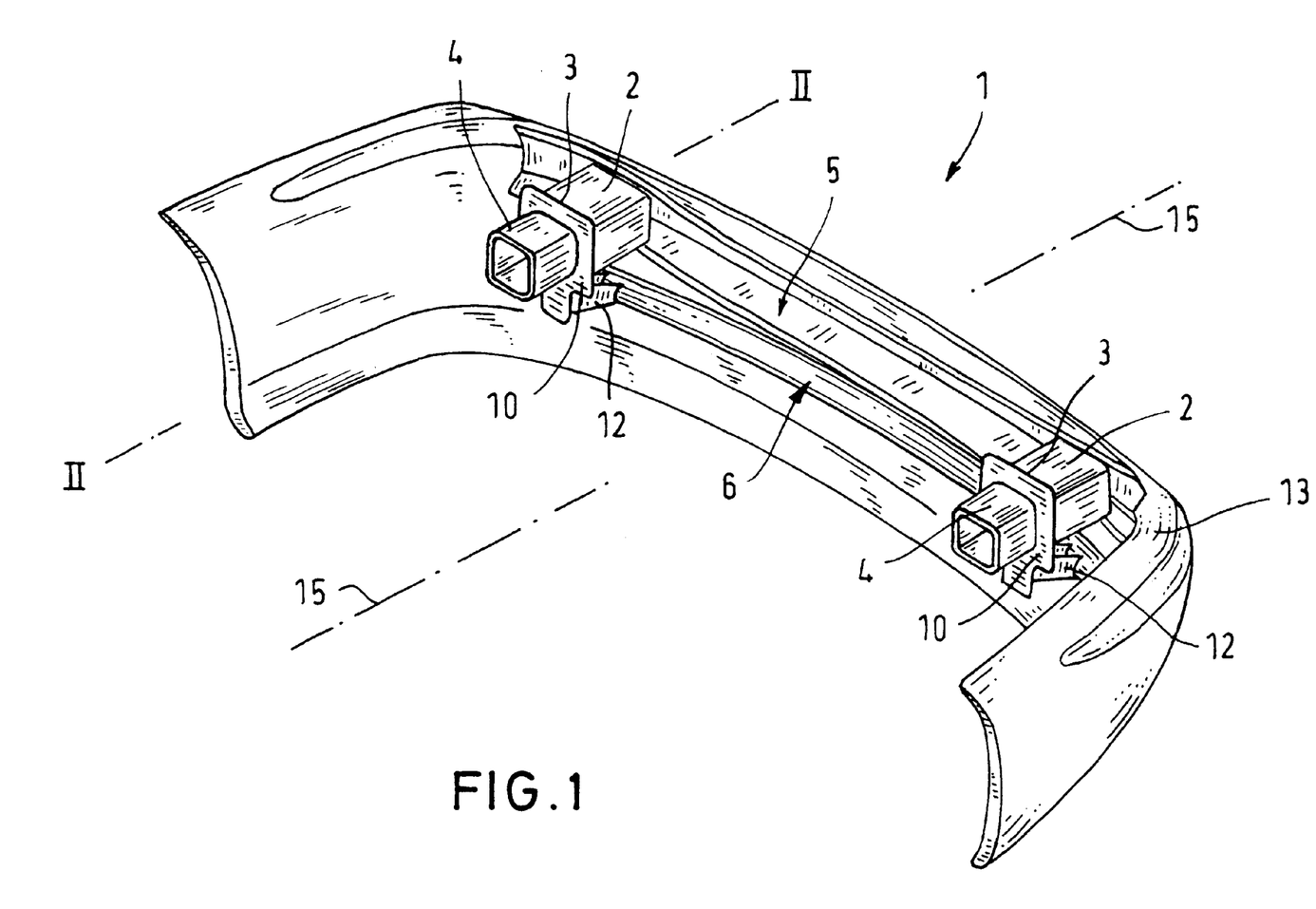
FIG. 1 is a perspective view of a bumper arrangement according to the invention for the front end of an automobile.

The bumper arrangement 1 shown in FIG. 1 is designed for the front end of a car body of an automobile which is not illustrated in the drawing.

Figure 2:
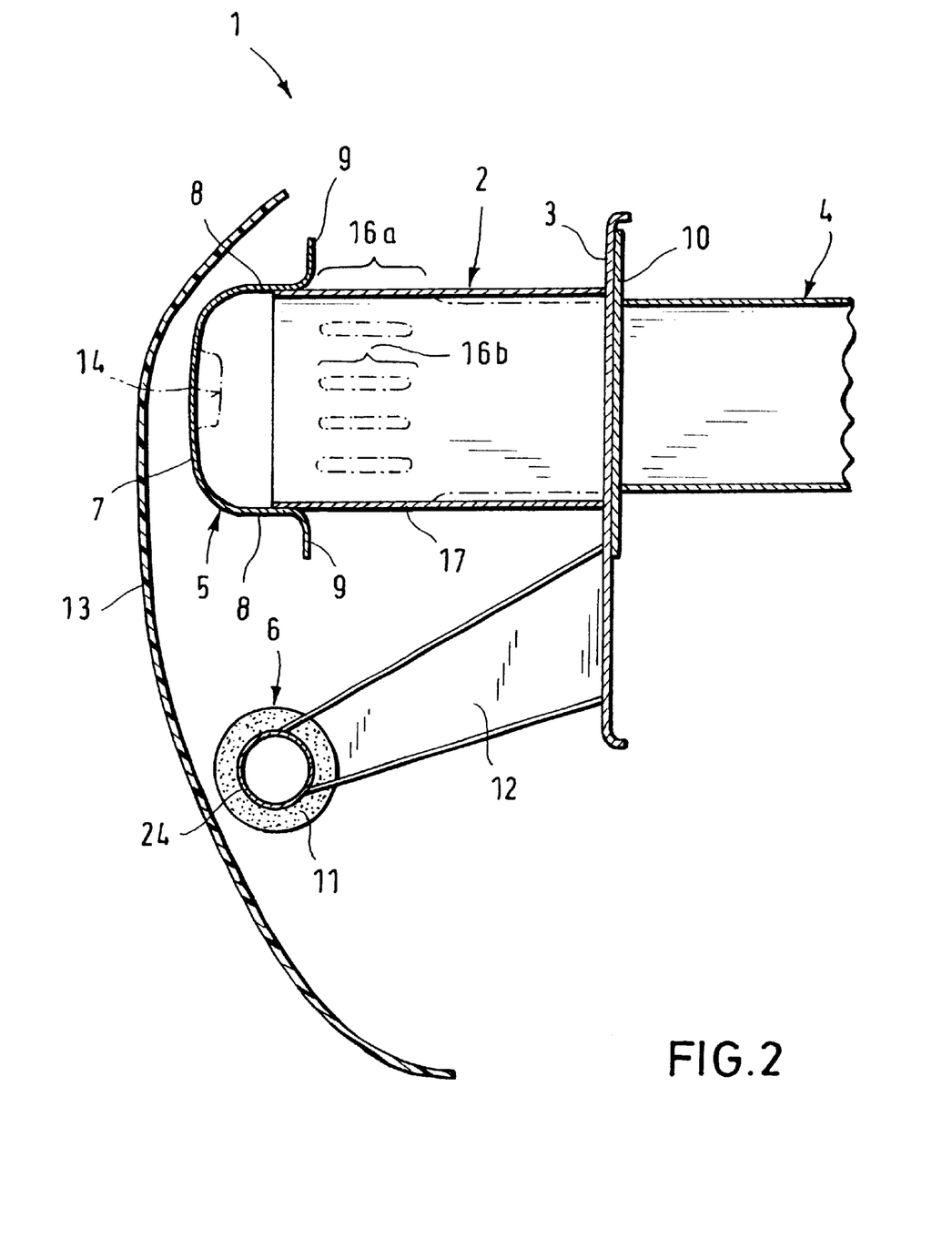
FIG. 2 is a schematic enlarged illustration of a vertical section of the bumper arrangement shown in FIG. 1 along the section line II—II, illustrating also three further variations.

The bumper arrangement 1 comprises, as can be seen in FIG. 2, a transverse support 5 which is connected by its ends via spacer consoles 2 comprised of rectangular hollow profiled members and stop plates 3 to the longitudinal support beams 4 of the car body. It also comprises a transverse beam 6 positioned below the transverse support 5.

The transverse support 5 is substantially U-shaped. It has a bottom stay 7, two legs 8 as well as two flanges 9. The spacer consoles 2 are welded to the transverse support 5. Each spacer console 2 is welded to a stop plate 3 which, in turn, is detachably connected to a stop plate 10 which is welded to the end face of each longitudinal support beam 4.

The transverse beam 6 below the transverse support 5 is tubular. It comprises at its surface 24 a circumferential coating 11 of an energy-absorbing material such as a foam.

The transverse beam 6 is connected below the spacer consoles 2 by slantedly extending spacer stays 12 to the stop plates 3. The spacer stays 12 can be embodied as profiled members such as, for example, U-shaped or hat-shaped profiled members. Also conceivable are spacer stays 12 in the form of hollow profiled members of any suitable cross-sectional shape.

In front of the transverse support 5 and the transverse beam 6, a cover 13 of a U-shaped configuration (FIG. 1) made of plastic (synthetic) material is arranged.

As indicated by dash-dotted lines in FIG. 2, the bottom stay 7 of the transverse support 5 facing the cover 13 can be provided with a longitudinal groove 14.

The transverse support 5 and/or the spacer consoles 2 can be divided at least over portions thereof into at least two deformation areas with different force levels arranged next to one another in the longitudinal vehicle direction 15.

Figure 3:
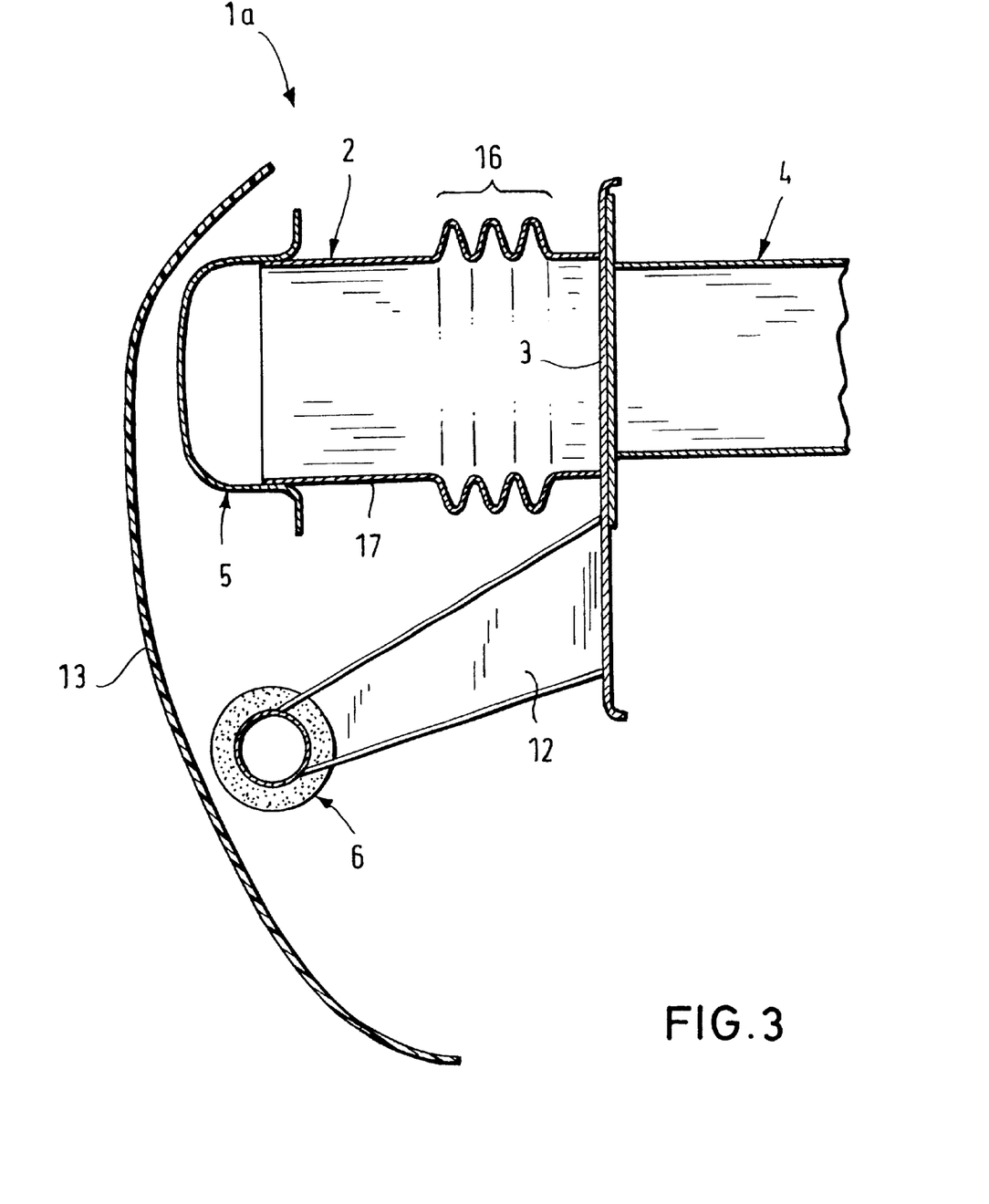
FIG. 3 is an illustration according to that of FIG. 2 of a fifth embodiment.
Figure 4:
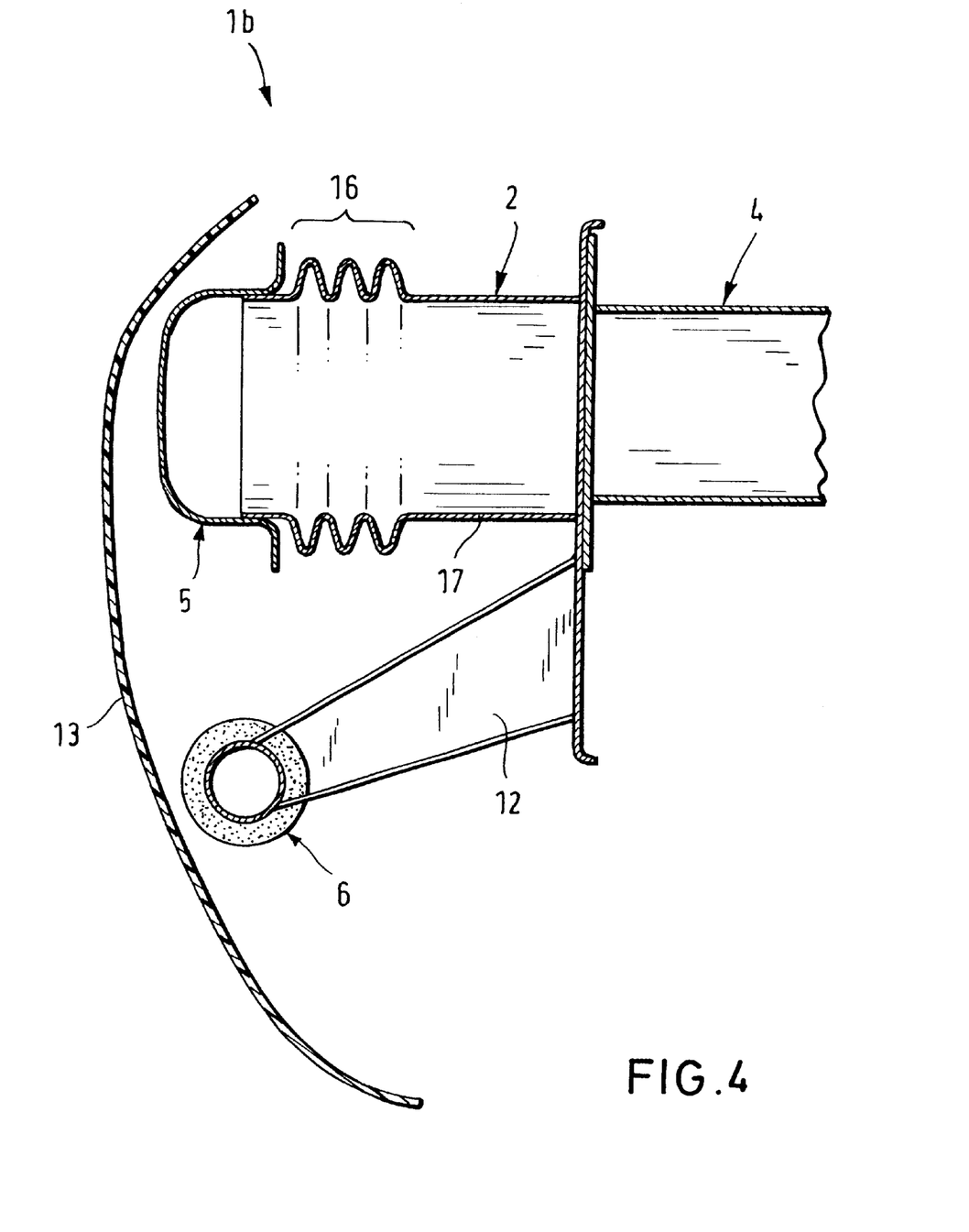
FIG. 4 is an illustration according to that of FIG. 2 of a sixth embodiment.

In this context, the bumper arrangements 1a and 1b illustrated in FIGS. 3 and 4 show that the spacer consoles 2 are comprised of hollow profiled members and the deformation areas 16 with low force level are formed by corrugations of the walls 17 of the spacer consoles 2.

In this context, it is possible to position the low force level deformation areas 16 of the spacer consoles 2 adjacent to the stop plates 3, according to the embodiment of FIG. 3, or adjacent to the transverse support 5, according to the embodiment of FIG. 4.

As also illustrated in dash-dotted lines in FIG. 2, the spacer consoles 2 comprised of hollow profiled members can have deformation areas 16a with low force level which are realized by reduction of the wall thickness of the walls 17 of the spacer consoles 2. These deformation areas 16a can also be positioned either adjacent to the stop plates 3 or adjacent to the transverse support 5, according to the embodiments of FIGS. 3 and 4, respectively.

Moreover, an embodiment is possible, also illustrated by dash-dotted lines in FIG. 2, in which the deformation areas 16b are embodied by a partial weakening of the walls 17 of the spacer consoles 2. This can be achieved by providing slotted holes. The deformation areas 16b can be positioned adjacent to the transverse support 5 or adjacent to the stop plates 3.

Figure 5:
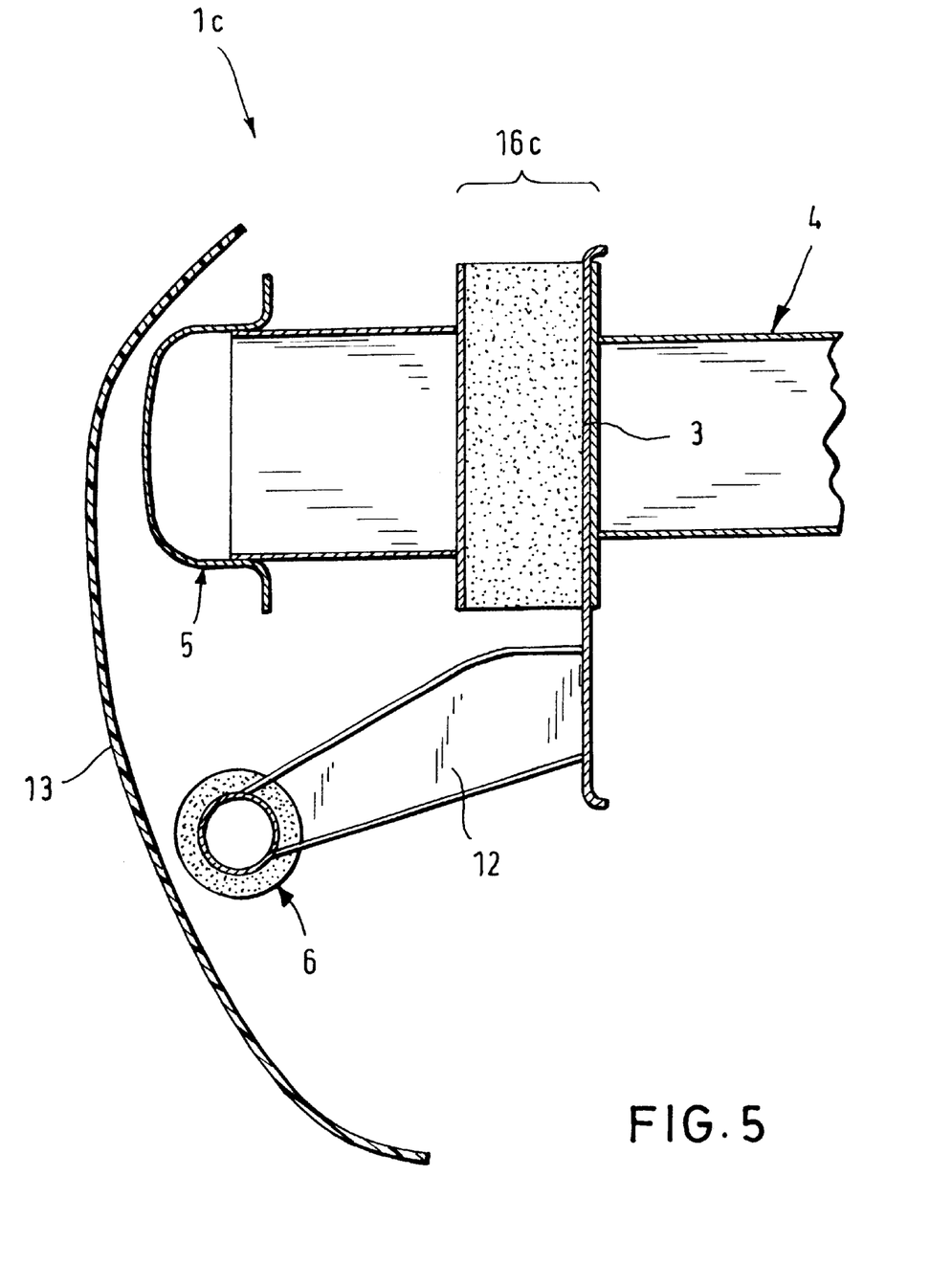
FIG. 5 is a schematic illustration corresponding to that of FIG. 2 of a seventh embodiment.

FIG. 5 shows a bumper arrangement 1c in which the deformation areas 16c with the low force level are formed by plate-shaped foam bodies. These deformation areas 16c can be positioned, as shown in FIG. 5, adjacent to the stop plates 3 or, according to FIG. 4, adjacent to the transverse support 5.

The transverse support 5 according to FIGS. 3 through 5 can be provided with a longitudinal groove 14 (see FIG. 2).

Figure 6:
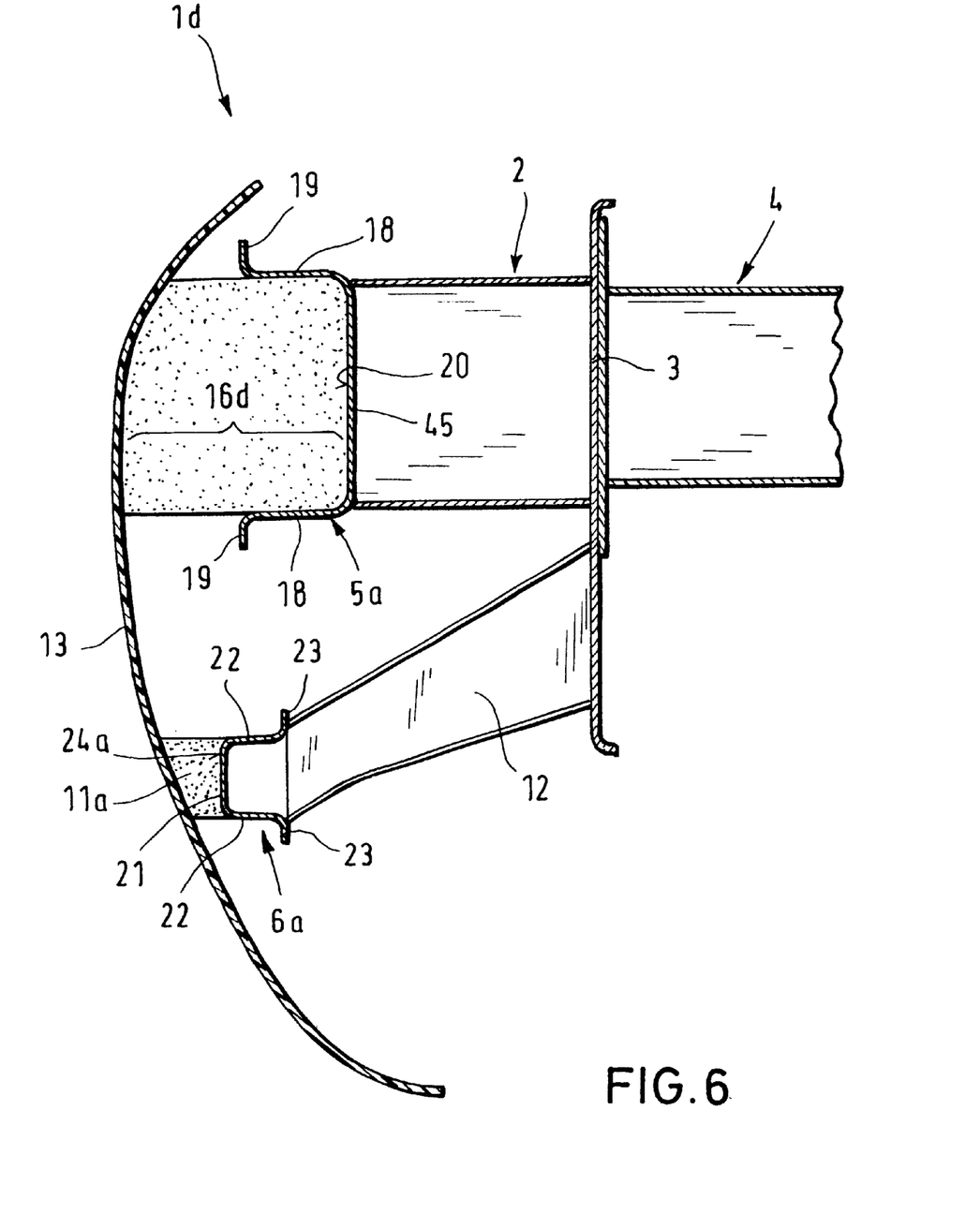
FIG. 6 is an illustration according to that of FIG. 2 of an eighth embodiment.

The bumper arrangement 1d illustrated in FIG. 6 shows a transverse support 5a with a U-shaped cross-section having legs 18 extending from the bottom stay 45 in the direction toward the cover 13. Flanges 19 are formed at the legs 18. The deformation area 16d with the low force level is formed by a foam body secured in the channel 20 of the transverse support 5a and projecting past the legs 18 toward the cover 13.

Furthermore, it is illustrated that in the bumper arrangement 1d of FIG. 6 the transverse beam 6a positioned below the transverse support 5a is comprised of a U-shaped profiled member with bottom stay 21, legs 22, and flanges 23. This transverse beam 6a is connected via spacers stays 12 positioned below the spacer consoles 2, also comprised of hollow profiled members, to the stop plates 3. These spacers stays 12 can also be hollow profiled members of any suitable cross-section, e.g. U-shaped or hat-shaped profiled members.

Also shown in FIG. 6 is that the hat-shaped transverse beam 6a is provided with a layer 11a of an energy-absorbing material such as a foam. The strip-shaped foam body forming the deformation area 16d on the transverse support 5a as well as the foam layer 11a at the transverse beam 6a are in contact with the inner side of the cover 13.

Figure 7:
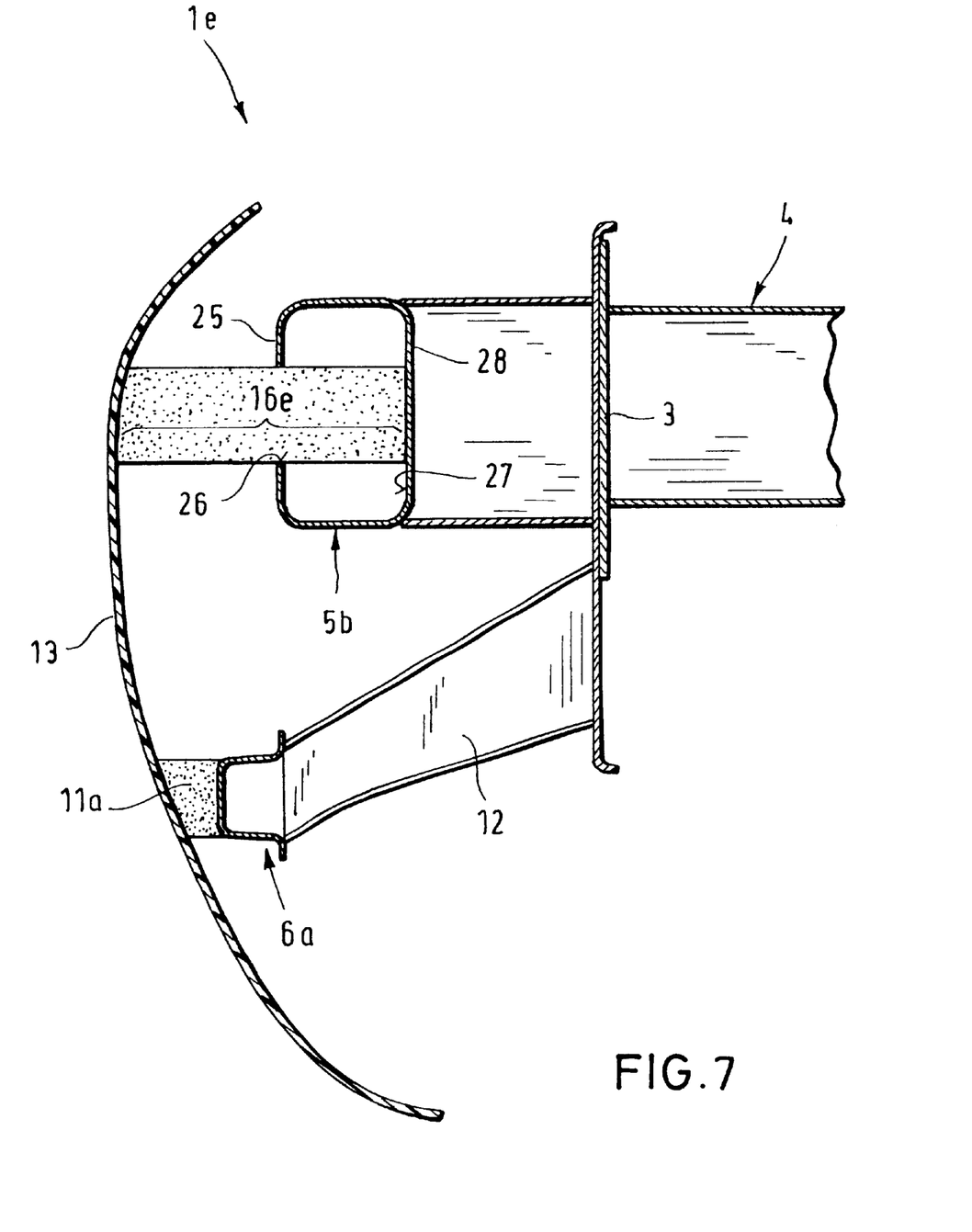
FIG. 7 is an illustration according to that of FIG. 2 of a ninth embodiment.

The bumper arrangement 1e illustrated in FIG. 7 has a transverse support 5b comprised of a rectangular hollow profiled member with a vertically arranged longitudinal axis of the cross-section and rounded corners. In the sidewall 25 facing the cover 13 several rectangular spaced-apart cutouts 26 are provided adjacent to one another. Foam blocks having a contour matched to the cutouts 26 are inserted into the cutouts 26 as deformation areas 16e with low force level. The foam blocks are in contact with the cover 13 and are supported on the inner surface 27 of the sidewall 28 opposite the sidewall 25 with the cutouts or openings 26.

Below the transverse support 5b a transverse beam 6a according to the embodiment of FIG. 6 is provided.

Figure 8:
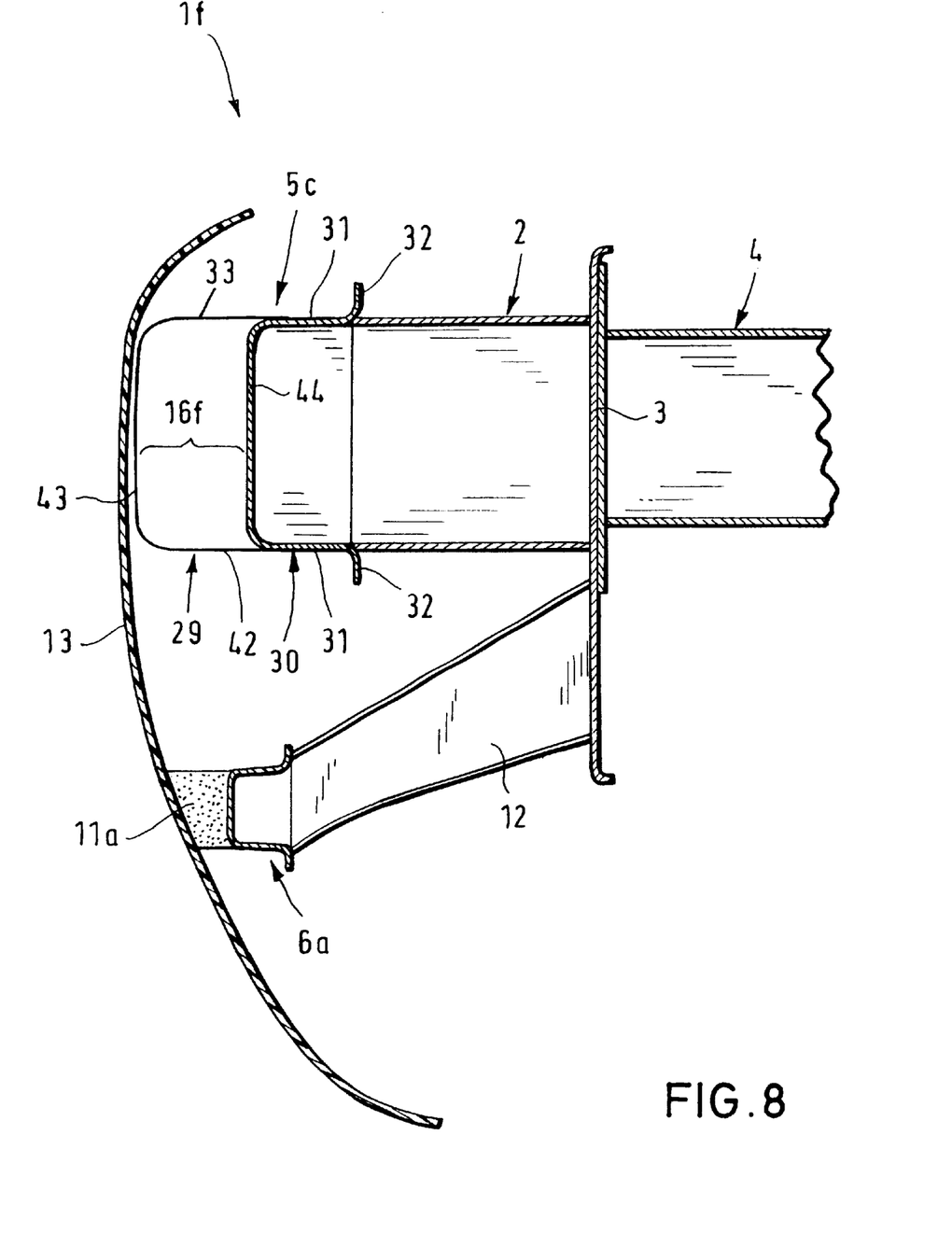
FIG. 8 is an illustration according to that of FIG. 2 of a tenth embodiment.

FIG. 8 shows a bumper arrangement 1f in which the transverse support 5c is comprised of two connected U-shaped profiled members 29, 30 having bottom stays 43, 44 and legs 42, 31, receptively. They form the different deformation areas. The U-shaped profiled member 29 positioned adjacent to the cover 13 is connected, for example by welding, via its legs 42 to the U-shaped profiled member 30 facing away from the cover 13. This U-shaped profiled member 30 has flanges 32 at its legs 31. The U-shaped profiled member 30 is, in turn, fastened to the spacer consoles 2 which are comprised of hollow profiled members. The deformation area 16f with the low force level is formed by a thinner wall 33 of the profiled member 29 positioned adjacent to the cover 13.

Below the transverse support 5c a transverse beam 6a is provided according to the embodiment illustrated in FIG. 6.

Figure 9:
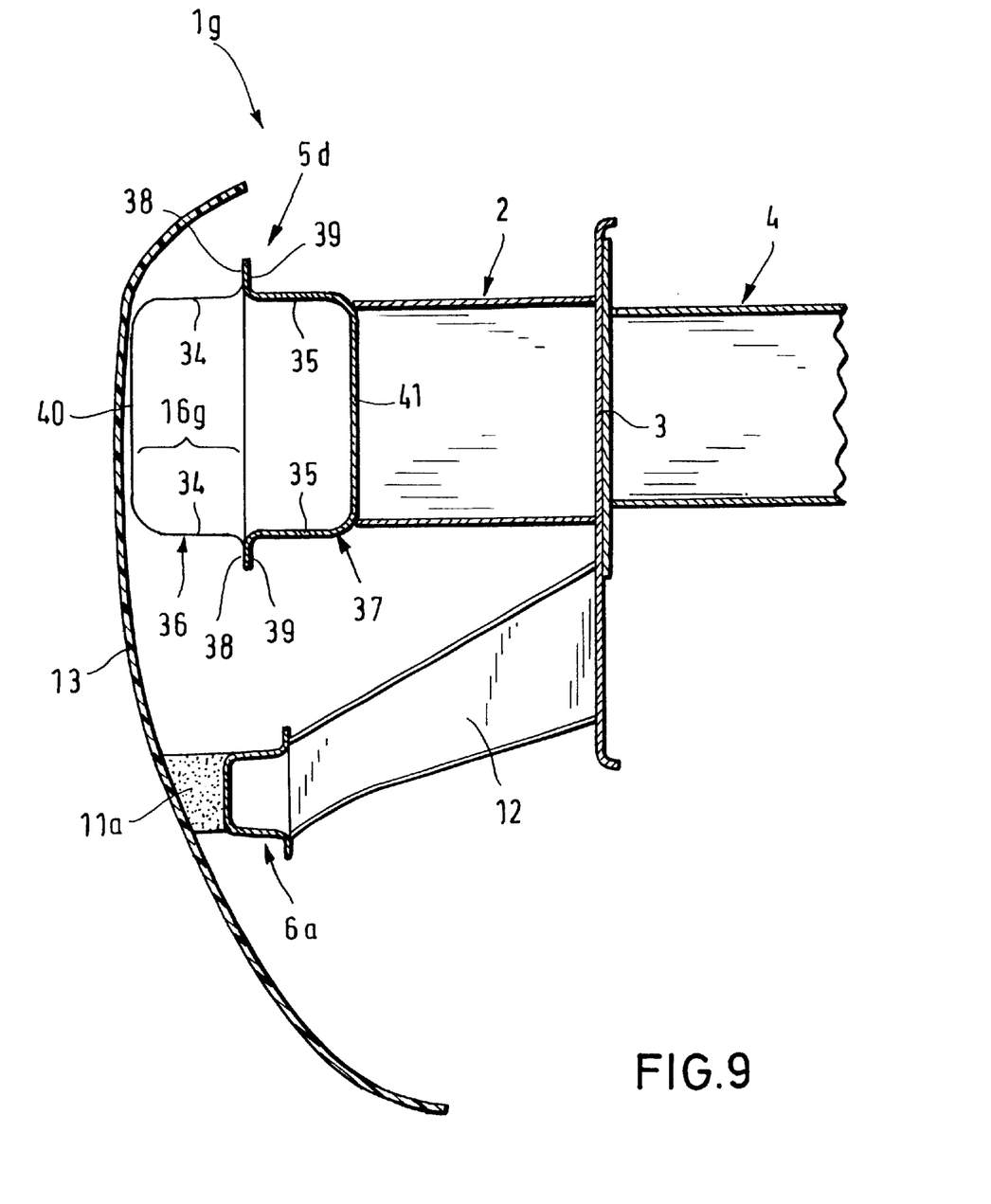
FIG. 9 is an illustration according to that of FIG. 2 of an eleventh embodiment.

In the embodiment illustrated in FIG. 9 the bumper arrangement 1g has a transverse support 5d comprised of two U-shaped profiled members 36, 37 which are arranged such that their legs 34, 35 point toward one another and which are connected via their legs 34, 35 to one another. For this purpose, the U-shaped profiled members 36, 37 have flanges 38, 39. The deformation area 16g with low force level is formed by the U-shaped profiled member 36 next to the cover 13 and is realized such that its wall 40 is thinner than the wall 41 of the U-shaped profiled member 37 facing away from the cover 13. The U-shaped profiled member 37 is connected to the spacer consoles 2 comprised of hollow profiled members.

Below the transverse support 5d a transverse beam 6a is positioned having a configuration as illustrated in FIG. 6.

Of course, it is conceivable that instead of the transverse beam 6a represented in FIGS. 6 through 9 the transverse beam 6 illustrated in FIGS. 1 through 5 can be used in the embodiments of FIGS. 6 through 9.

On the other hand, in the embodiments according to FIGS. 1 through 5 it is possible to employ instead of the illustrated transverse beam 6 the transverse beam 6a of the embodiments illustrated in FIGS. 6 through 9.

While specific embodiments of the invention have been shown and described in detail to illustrate the inventive principles, it will be understood that the invention may be embodied otherwise without departing from such principles.

What is claimed is:

1. A bumper arrangement for a front end or a rear end of an automobile having a bumper cover enclosing the bumper arrangement, the bumper arrangement comprising:

a transverse support having a first and a second end;

a first spacer console connected to the first end of the transverse support and a second spacer console connected to the second end of the transverse support;

a first stop plate connected to the first spacer console opposite the transverse support and a second stop plate connected to the second spacer console opposite the transverse support;

the first and second stop plates configured to secure the bumper arrangement to longitudinal support beams of a car body extending in a longitudinal direction of the automobile;

a transverse beam positioned below the transverse support in a mounted position of the bumper arrangement, wherein the transverse beam and the transverse support are substantially arranged in a common vertical plane;

spacer stays having a first end connected to the transverse beam and a second end connected exclusively to the stop plates on a side of the stop plates facing the cover, wherein the spacer stays are positioned vertically below the spacer consoles and spaced from the spacer consoles in the mounted position of the bumper arrangement;

wherein one or more of the transverse support and the spacer consoles, at least over portions thereof, have two or more deformation areas arranged next to one another in the longitudinal direction of the automobile and wherein the at least two deformation areas have different force levels;

wherein the transverse beam has a surface coating comprised of an energy-absorbing material at least in areas facing away from the stop plates.

2. The bumper arrangement according to claim 1, wherein the transverse beam is tubular.

3. The bumper arrangement according to claim 1, wherein the transverse beam is a profiled member.

4. The bumper arrangement according to claim 1, wherein the spacer stays are profiled members.

5. The bumper arrangement according to claim 1, wherein the spacer stays are hollow profiled members.

6. The bumper arrangement according to claim 1, wherein the spacer consoles are hollow profiled members and wherein first ones of the deformation areas having a lower force level than second ones of the deformation areas are formed by sidewalls of the spacer consoles having corrugations.

7. The bumper arrangement according to claim 1, wherein the spacer consoles are hollow profiled members and wherein first ones of the deformation areas having a lower force level than second ones of the deformation areas are formed by sidewalls of the spacer consoles having a reduced wall thickness.

8. The bumper arrangement according to claim 1, wherein the spacer consoles are hollow profiled members and wherein first ones of the deformation areas having a lower force level than second ones of the deformation areas are formed by sidewalls of the spacer consoles having portions of reduced strength.

9. The bumper arrangement according to claim 1, wherein the spacer consoles are hollow profiled members and wherein first ones of the deformation areas having a lower force level than second ones of the deformation areas are formed by foamed bodies.

10. The bumper arrangement according to claim 1, wherein first ones of the deformation areas having a lower force level than second ones of the deformation areas are located proximal to the transverse support.

11. The bumper arrangement according to claim 1, wherein first ones of the deformation areas having a lower force level than second ones of the deformation areas are located proximal to the stop plates.

12. The bumper arrangement according to claim 1, wherein the transverse support is a U-shaped profiled member and has a bottom stay positioned remote from the spacer console, wherein the bottom stay has a longitudinal groove projecting into an interior of the U-shaped profiled member.

13. The bumper arrangement according to claim 1, wherein the transverse support is a U-shaped profiled member comprising legs and a bottom stay connecting the legs, wherein the legs and the bottom stay define a channel and the bottom stay is arranged proximal to the spacer console, wherein first ones of the deformation areas having a lower force level than second ones of the deformation areas are formed by a foamed strip member inserted into the channel and projecting from the channel past the ends of the legs.

14. The bumper arrangement according to claim 1, wherein the transverse support is tubular and has openings facing away from the spacer consoles, wherein the deformation areas are formed by several foamed bodies inserted into the tubular transverse support and projecting outwardly through the openings in a direction away from the spacer consoles.

15. The bumper arrangement according to claim 1, wherein the transverse support is comprised of two U-shaped profiled members each having a bottom stay and two legs, wherein the bottom stay of a first one of the U-shaped profiled members is connected to ends of the legs of a second one of the U-shaped profiled members and the legs of the two U-shaped profiled members point toward the stop plates, and wherein the second U-shaped profiled member positioned remote from the stop plates forms a first one of the deformation areas having a lower force level than a second one of the deformation areas.

16. The bumper arrangement according to claim 1, wherein the transverse support is comprised of two U-shaped profiled members each having two legs and a bottom stay connecting the two legs, wherein the two U-shaped members are arranged to one another such that the bottom stays are facing away from one another and the legs point toward one another, wherein the legs of the two U-shaped profiled members are connected to one another, and wherein one of the U-shaped profiled members is positioned remote from the spacer consoles and forms a first one of the deformation areas having a lower force level than a second one of the deformation areas.

* * * * *